United States Patent Office 3,336,263
Patented Aug. 15, 1967

3,336,263
PROCESS FOR PREPARING COPOLYMERS OF FORMALDEHYDE AND N,N'-METHYLENEBIS-ACRYLAMIDE AND RESULTING PRODUCT
Kornel D. Kiss, University Heights, and Clarence L. Sturm, Painesville, Ohio, assignors to Diamond Alkali Company, Cleveland, Ohio, a corporation of Delaware
No Drawing. Filed Mar. 2, 1964, Ser. No. 348,809
6 Claims. (Cl. 260—72)

This invention relates to novel thermoplastic compositions of matter. More particularly, it relates to copolymers of high thermal stability which are structurally related to polyoxymethylene.

Oxymethylene polymers, which are now well known in the art, may be prepared by polymerizing formaldehyde and may also be prepared from trioxane and other formaldehyde oligomers. Oxymethylene polymers are thermoplastic materials of varying molecular weight composed of recurring oxymethylene —$CH_2O$— units joined together in linear chains which may be terminated at one or at both ends by thermally unstable hydroxyl groups, depending upon the method of preparation. These polymers typically will be degraded or decomposed in varying degrees when exposed to elevated temperatures encountered during processing. To minimize degradation, therefore, oxymethylene polymers prior to being processed are usually further treated such as by chain end-group "capping," i.e., by converting the unstable hydroxyl groups to more stable ester or ether groups and/or by incorporating therewith additives which will inhibit polymer degradation to a substantial degree.

It is an object of this invention, therefore, to provide a polymeric composition structurally related to polyoxymethylene and possessing the same toughness and strength properties, but which possesses inherently an improved resistance to thermal degradation.

It is another object of this invention to provide a composition having a high degree of thermal stability which suitably may be employed to prepare tough and durable plastic articles such as films, moldings, extrusions and the like.

It is still another object of this invention to provide tough and durable plastic articles, such as described above, from an oxymethylene copolymer composition having a high degree of thermal stability.

These and other objects are accomplished by copolymerizing, under substantially anhydrous conditions and in the presence of an ionic-type polymerization catalyst or initiator, formaldehyde with N,N'-methylenebisacrylamide which has the structure

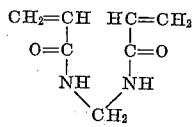

More specifically, the present invention involves the preparation of useful, easily workable oxymethylene copolymer compositions by polymerizing, under conditions as stated above, a monomeric mixture containing from about 80 up to 99.9 mol percent of formaldehyde and from about 0.1 up to 20 mol percent of N,N'-methylenebisacrylamide monomer, said process being conducted at a temperature within the range of −80° C. to +30° C.

The solid copolymer products obtained exhibit inherently a high degree of thermal stability, being not subject to substantial weight reduction, i.e., decomposition or degradation, when exposed to temperatures of at least 200° C. or above, contrary to the significant or complete decomposition of unstabilized polyoxymethylenes prepared by similar processes and tested at these same temperatures. Therefore, the copolymers of this invention may be fabricated at the required elevated temperatures without first being stabilized as by "capping" of unstable endgroups. Additionally, these copolymers also may be processed without the use of stabilizing additives therewith.

As designated herein, the thermal stability of the copolymer products of this invention is the value representing the constant rate at which these copolymers degrade or decompose at an elevated temperature at which degradation can be easily and accurately measured. This value, i.e., the reaction rate constant for thermal degradation, is measured by well known thermogravimetric analytical techniques, using a Stanton Automatic Recording Thermorbalance, High Temperature Model, having a platinum/radium bifilar wound furnace. Throughout the test, the copolymer is maintained at a temperature of 220° C., the decomposition of the copolymer as measured by loss in weight and the time of the test in minutes being automatically recorded. After the heat treatment, the decomposition rate of the copolymer is obtained by plotting, as the ordinate, the logarithm of the weight percent of the remaining undegraded copolymer versus the corresponding times of oven exposure. A curve drawn through the plotted values indicates that the copolymer degrades at a slow, even rate throughout the entire degradation period. This slow degradation is in contrast to the rather rapid degradation exhibited by numerous other oxymethylene copolymers when first exposed to the test temperature. This slow, even rate of degradation thus further indicates the excellent thermal stability of the copolymer products of this invention. The reaction rate constant for thermal degradation of the copolymer is calculated from the entire degradation curve obtained and is expressed as weight percent per minute. To be satisfactory, the copolymers of this invention exhibit generally a reaction rate constant for thermal degradation at 220° C. of 1 weight percent per minute, or less, with copolymers prepared by the preferred methods described herein exhibiting a reaction rate constant of 0.7 weight percent per minute, or less.

In the copolymerization process, it is believed that the N,N'-methylenebisacrylamide may be incorporated primarily into the copolymer by addition through one of its carbon-to-carbon double bonds, so that the growing copolymer chain contains recurring oxymethylene units interspersed with recurring units derived from the said acrylamide monomer which have the structure

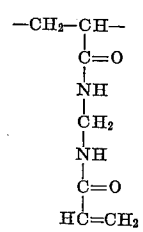

As copolymerization progresses, it is believed that addition may also proceed through the remaining carbon-to-carbon double bond of at least a portion of the incorporated monomer units structurally represented above, these units thus serving as cross-linking agents by being interspersed between recurring oxymethylene units of adjacent copolymer chains as represented by the following structure II
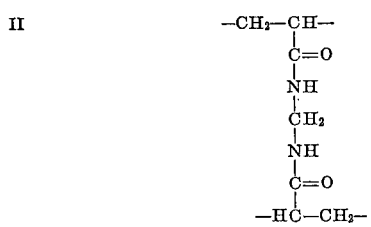

It should be noted that further addition of the comonomer through its second double bond, as represented by structure II above, most likely occurs substantially in the process, since the copolymer product obtained is insoluble or is, in some instances, only slightly soluble in many organic liquids which dissolve analogous oxymethylene copolymers which are not crosslinked materials.

It is also possible that in the reaction, the N,N'-methylenebisacrylamide monomer may be incorporated into the growing copolymer chain by a cyclization, i.e., ring closure, of the monomer molecule, which reaction is somewhat analogous to monomer cyclization which occurs in the homopolymerization of, for example, acrylic anhydride. Thus, from this type monomer addition reaction, the resulting copolymer chain may contain interspersed with recurring oxymethylene units, recurring cyclic units derived from the N,N'-methylenebisacrylamide monomer having the structure III
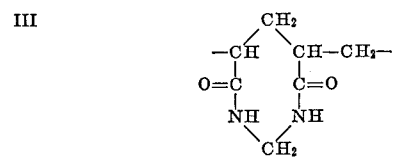

In the copolymer chain, the units derived from the N,N'-methylenebisacrylamide monomer as previously described may be interspersed singly between recurring oxymethylene units. They may likewise be present therein as comonomer blocks, i.e., segments of the chain comprising at least two of any one or of all of the units (as represented by structures I, II and III above) sequentially joined together with no oxymethylene unit between them.

Depending upon the percentage of N,N'-methylenebisacrylamide monomer present in the copolymer products of this invention, these materials have melting points somewhat lower than, or approximately the same as, oxymethylene homopolymer, i.e., these copolymers have melting points in the range of about 150° to 180° C. In appearance, the copolymers resemble polyoxymethylene and can be fabricated like polyoxymethylene into useful plastic articles using conventional processing equipment and techniques.

The copolymer products of this invention generally may contain from about 0.1 up to about 20 mol percent of N,N'-methylenebisacrylamide, which percentage is determined by elemental nitrogen analysis of the copolymers. That is to say, the copolymers may contain from the said N,N'-methylenebisacrylamide monomer and from about 80 up to about 99.9 percent of recurring oxymethylene units. The preferred copolymers contain from about 0.1 up to 10 percent of recurring units derived from the said acrylamide monomer and from about 90 up to 99.9 percent of recurring oxymethylene units.

The copolymerization reaction is effected in the presence of an ionic-type catalyst selected from compounds such as alkali metals, e.g., lithium, sodium, potassium and the like; alkoxides of alkali metals such as the methoxides, tertiary butoxides, etc. of lithium, sodium or potassium; and organometallic compounds such as butyl lithium, diethyl zinc, tributyl boron, phenyl magnesium bromide, ethyl aluminum dichloride and the like. Alkali metal catalysts may be employed in either the solid state or as dispersions in saturated hydrocarbons. The alkali metal alkoxides and the organometallic compounds are typically employed as solutions in suitable solvents. In general, the amount of catalyst employed in the process may vary from about 0.001 to 10 millimols per liter of reaction medium. However, it is preferable to employ about 0.005 to 8 millimols per liter.

The reaction may be conducted in any inert anhydrous organic solvent for the monomer and for the catalyst and which is a liquid at the reaction temperature. Suitable solvents include aliphatic, cycloaliphatic and aromatic hydrocarbons especially such hydrocarbons which contain from 3 to 12 carbon atoms per molecule, e.g., n-heptane, cyclohexane, toluene, and the like. Typically, a ratio of 3 to 25 parts solvent for each part of formaldehyde is employed in the reaction.

It is essential that the copolymerization process be conducted under anhydrous, or substantially anhydrous, conditions. Therefore, a catalyst solution employed is prepared and then kept prior to use in a nitrogen atmosphere; the liquid reaction medium is dried prior to use and the process is carried out entirely under nitrogen.

In carrying out the reaction, temperatures ranging from −80° C. to +30° C. and reaction times of from 5 minutes to 30 hours generally may be employed. Preferably, however, the reaction is conducted at a temperature from about −70° to about +15° C. for a time period ranging from about 2 to 10 hours.

Upon completion of the reaction, the copolymerization mixture is filtered to recover the product precipitate. Before being dried, the product may then be purified by leaching it well with acetone to remove any unreacted monomers remaining. Additionally, the finished copolymer product may be heated briefly at a temperature of 100° to 150° C. to decompose any loose, unstable chain ends.

As stated earlier, the copolymers of this invention possess inherently a high degree of thermal stability and may be processed, as prepared, without any further stabilizing treatment such as by chain end-group "capping" and/or by incorporating stabilizing additives therewith. However, it is to be understood that the copolymers may be so treated, if desired, without departing from the intended scope of this invention.

The copolymer products of this invention may be used to prepare articles such as moldings, films, sheets, rods, tubes, fibers, filaments and the like by conventional molding, casting and/or extrusion processes such as are practiced at the present time. The finished articles exhibit generally the excellent physical and chemical properties which are typical of articles fabricated from oxymethylene homopolymers. In processing, the copolymers may be unmodified or, if desired, may have incorporated therewith additives such as antioxidants, fillers, pigments, stabilizers, processing aids and the like which are oftentimes employed when processing thermoplastic materials.

In order that those skilled in the art may more completely understand the present invention and the preferred methods by which the same may be carried into effect the following specific examples are offered.

*Example 1*

A two-liter, four-necked, round-bottom flask is fitted with an agitator, a thermometer well, a reflux condenser, a rubber serum injection cap and with inlet and outlet tubes for passage of nitrogen and formaldehyde vapors. An electrically-heated flask used as a pyrolyzer to supply formaldehyde monomer to the polymerizer is fitted with a thermometer well and with gas inlet and outlet tubes and is connected to the polymerization flask. After nitrogen purging of the apparatus assembly, 34.7 g. of trioxymethylene (reagent grade) is charged to the pyrolyzer, 1000 ml. of anhydrous toluene to the polymerization flask and agitation is started. While nitrogen purging is continued, 4.63 g. of N,N'-methylenebisacrylamide is added to the polymerizer and is dissolved by heating the solvent to 50° C. The flask and its contents are then cooled to 15° C., at which temperature formaldehyde vapors generated from the pyrolyzer are introduced into the polymerization mixture below the surface of the liquid. Formaldehyde generation is continued until the trioxymethylene is exhausted. Eight ml. of tributyl boron catalyst (a one-molar solution in toluene) is then injected into the polymerizer, after which the reaction is continued for 4 hours. At the end of this time period, the reaction mixture is discharged from the polymerizer and the product precipitate isolated therefrom by filtration. The separated product is washed well with acetone and finally dried at 60° C. under vacuum. There is recovered 26.1 g. (70% of theoretical yield) of a fine, white polymeric material which contains 0.13 mol percent of N,N'-methylenebisacrylamide, as determined by elemental nitrogen analysis. This product has a fairly sharp melting point of 176° C. When tested by thermogravimetric analysis, the copolymer exhibits a reaction rate constant for thermal degradation at 220° C. of 0.65 weight percent per minute, all of the copolymer degrading at this slow, even rate throughout the test period. A portion of the copolymer is molded for 1 minute at 210° C. under a pressure of 4000 p.s.i. No copolymer is lost by degradation during molding. The molded products obtained are tough, rigid, white, opaque moldings which show no evidence of thermal degradation.

*Example 2*

An oxymethylene homopolymer is prepared following the general procedure, as outlined in Example 1. The same polymerization setup is employed, except that a one-liter flask is used as the polymerizer. In this example, after charging 80 g. of trioxymethylene to the pyrolyzer and 500 ml. of anhydrous n-heptane to the polymerizer, as described in Example 1, the polymerization flask and the solvent are cooled to −70° C. before injecting 2 ml. of a one-molar solution of butyl lithium catalyst in n-heptane. In this example, formaldehyde is generated continuously throughout the reaction and after formaldehyde vapors are initially introduced into the reactor after catalyst addition, the reaction is carried out for a period of 4½ hours. During this time the reaction mixture gradually warms to a temperature of −50° C. and is then warmed further by gentle heating to a final temperature of +60° C. At the end of the reaction period, the formaldehyde generator is shut down and the reaction mixture is cooled to room temperature before nitrogen purging is discontinued. The reaction mixture is then discharged from the polymerizer and the polymeric product is isolated, purified and dried as described in Example 1. Ten and four-tenths g. of oxymethylene polymer is recovered. This polymer, which has an inherent viscosity of 1.57, melts sharply at 186° C. When tested for thermal stability by thermogravimetric analysis this polymer exhibits a reaction rate constant for thermal degradation at 220° C. of 3.5 weight percent per minute, decomposing at a steady, rapid rate throughout the determination. The material is completely decomposed and disappears about 35 minutes after the test has started. This oxymethylene homopolymer thus shows significantly poorer thermal stability by comparison to the formaldehyde-N,N'-methylenebisacrylamide copolymer product of the previous example. When the homopolymer product of this example is molded under conditions as outlined in the previous example, badly distorted dull pieces of opaque material are obtained. These pieces are brittle and appear somewhat porous in nature, as if partialy foamed by gaseous formaldehyde monomer evolved by decomposition of the polymer during heating.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for preparing a copolymer composition of high thermal stability which comprises polymerizing under substantially anhydrous conditions at a temperature of −80° C. to 30° C. and in the presence of an ionic polymerization catalyst selected from the group consisting of alkali metals, alkoxides of alkali metal and organometallic compounds, a monomeric mixture comprising, as the major constituent, formaldehyde and as the minor constituent, N,N'-methylenebisacrylamide; and thereafter recovering a solid copolymer containing from about 80 up to 99.9 percent of recurring oxymethylene units and from about 0.1 up to 20 percent of recurring units derived from the said N,N'-methylenebisacrylamide.

2. A process for preparing a coplymer composition of high thermal stability which comprises copolymerizing in an organic liquid reaction medium under substantially anhydrous conditions, at a temperature ranging from −80° to +30° C. and for a time period of from 5 minutes to 30 hours, a major amount of formaldehyde and a minor amount of N,N'-methylenebisacrylamide in the presence of between 0.001 to about 10 millimols per liter of reaction medium, of an ionic polymerization catalyst selected from the group consisting of alkali metals, alkoxides of alkali metals and organometallic compounds; and recovering a solid copolymer containing from about 80 to 99.9 percent of recurring oxymethylene units and from about 0.1 up to about 20 percent of recurring units derived from N,N'-methylenebisacrylamide, the said copolymer composiiton having a reaction rate constant for thermal degradation at 220° C. of no more than 1 weight percent per minute.

3. The process of claim 2 which is conducted at a temperature ranging from −70° to +15° C. for a time period of 2 to 10 hours.

4. The process of claim 2 in which the organic liquid reaction medium is selected from the group consisting of aliphatic, cycloaliphatic and aromatic hydrocarbons having from 3 to 12 carbon atoms per molecule.

5. The process of claim 2 in which the catalyst is an organometallic compound.

6. A normally solid thermoplastic copolymer of about 80 to 99.9 mole percent of formaldehyde and about 0.1 to 20 mole percent of N,N'-methylenebisacrylamide produced by the process of claim 5.

References Cited

UNITED STATES PATENTS

| 3,194,790 | 7/1965 | Brown | 260—72 |
| 3,225,121 | 12/1965 | Baker | 260—73 |

FOREIGN PATENTS

| 614,946 | 7/1962 | Belgium. |
| 1,089,969 | 3/1961 | Germany. |
| 1,272,971 | 8/1961 | France. |

OTHER REFERENCES

Angewandte Chemie, "Polyoxymethylene," vol. 73, No. 6, pages 177–186, January 1961.

JOSEPH L. SCHOFER, *Primary Examiner.*

J. A. SEIDLECK, *Assistant Examiner.*